(12) United States Patent
Son

(10) Patent No.: US 7,552,163 B2
(45) Date of Patent: Jun. 23, 2009

(54) MONTGOMERY MODULAR MULTIPLIER AND METHOD THEREOF

(75) Inventor: Hee Kwan Son, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 842 days.

(21) Appl. No.: 10/736,838

(22) Filed: Dec. 17, 2003

(65) Prior Publication Data

US 2004/0225702 A1 Nov. 11, 2004

(30) Foreign Application Priority Data

May 9, 2003 (KR) ............... 10-2003-0029445

(51) Int. Cl.
*G06F 7/00* (2006.01)
(52) U.S. Cl. ..................................... 708/492
(58) Field of Classification Search ............... None
See application file for complete search history.

(56) References Cited

U.S. PATENT DOCUMENTS

| 4,646,257 | A | * | 2/1987 | Essig et al. | ................. | 708/630 |
| 5,790,874 | A | * | 8/1998 | Takano et al. | ............... | 713/320 |
| 6,438,569 | B1 | * | 8/2002 | Abbott | ....................... | 708/603 |
| 6,668,267 | B1 | * | 12/2003 | Pomet | ...................... | 708/492 |

FOREIGN PATENT DOCUMENTS

FR 2 791 157 3/1999

OTHER PUBLICATIONS

P. Adrian Wang, et al., "New FLSI Architectures of RSA Public-Key Cryptosystem", *IEEE International Symposium on Circuits and Systems*, (Jun. 9-12, 1997), 2040-2043.

Alexandre F. Tenca, et al., "High-Radix Design of a Scalable Modular Multiplier", *3rd International Workshop, Proceedings, Lecture Notes in Computer Science*, Berlin: Springer, DE, (May 14, 2001), 2162:185-201.

Stephen E. Eldridge, et al. "Hardware Implementation of Montgomery's Modular Multiplication Algorithm", *IEEE Transactions on Computers*, (Jun. 1993), 42:6:693-699.

European Search Report dated Oct. 6, 2004.

* cited by examiner

*Primary Examiner*—Benjamin E Lanier
*Assistant Examiner*—Devin Almeida
(74) *Attorney, Agent, or Firm*—Harness, Dickey & Pierce, P.L.C.

(57) ABSTRACT

A method for power reduction and increasing computation speed for a Montgomery modulus multiplication module for performing modulus multiplication. A coding scheme reduces the hamming distance for partial product and multiple modulus selection, reducing MUX operations and power consumption. Synchronization registers synchronize partial product and multiple modulus values input to an accumulator reducing glitch and/or increase computation speed. Registers provide storage of previous values and reduce the need to obtain the values from a MUX, reducing MUX operations and/or reducing power consumption.

27 Claims, 5 Drawing Sheets

Fig. 3

| Inputs of MR(70) | | | Selected $MM_i$ | Outputs of MR(70) | | |
|---|---|---|---|---|---|---|
| M[1] | $SPP_i$[1] | $SPP_i$[0] | | SEL_MM[1:0] | EN_MM | NEG_MM |
| 0 | 0 | 0 | 0 | SEL_MM_D[1:0] | 0 | 0 |
| 0 | 0 | 1 | -M | 10 | 1 | 1 |
| 0 | 1 | 0 | 2M | 11 | 1 | 0 |
| 0 | 1 | 1 | M | 00 | 1 | 0 |
| 1 | 0 | 0 | 0 | SEL_MM_D[1:0] | 0 | 0 |
| 1 | 0 | 1 | M | 00 | 1 | 0 |
| 1 | 1 | 0 | 2M | 11 | 1 | 0 |
| 1 | 1 | 1 | -M | 10 | 1 | 1 |

Fig. 4

| Inputs of BR(80) | | | Selected PP$_i$ | Outputs of BR(80) | | | |
|---|---|---|---|---|---|---|---|
| B[1] | B[0] | B[r] | | SEL_PP[1:0]<br>SEL_PP_D[1:0] | EN_PP | NEG_PP | PP$_i$[1],PP$_i$[0] |
| 0 | 0 | 0 | 0 | 00 | 0 | 0 | 0,0 |
| 0 | 0 | 1 | A | 00 | 1 | 0 | A[1],A[0] |
| 0 | 1 | 0 | A | 11 | 1 | 0 | A[1],A[0] |
| 0 | 1 | 1 | 2A | 01 | 1 | 0 | A[0],0 |
| 1 | 0 | 0 | -2A | 10 | 1 | 1 | A[0],0 |
| 1 | 0 | 1 | -A | 10 | 1 | 1 | A[1]^A[0],A[0] |
| 1 | 1 | 0 | -A | SEL_PP_D[1:0] | 1 | 1 | A[1]^A[0],A[0] |
| 1 | 1 | 1 | 0 | | 0 | 0 | 0,0 |

MONTGOMERY MODULAR MULTIPLIER AND METHOD THEREOF

CROSS-REFERENCE TO RELATED APPLICATIONS

The present application claims priority from a Korean application having Application No. P2003-29445, filed 9 May 2003 in Korea, the disclosure of which is incorporated herein in its entirety by reference.

FIELD OF THE INVENTION

The present invention relates to the field of cryptosystems and, more particularly, to a Montgomery modular multiplier.

BACKGROUND OF THE INVENTION

As the use of network systems grows, protection of network communications becomes more important. Protection of the integrity and secrecy of data becomes an issue.

The basic process of code transporting, and decoding a message includes taking the message (plaintext), modifying (encrypting) the plaintext into ciphertext, transmitting the ciphertext to a receiver, and de-modifying (decrypting) the ciphertext, to recover the original message.

In cryptosystems, an encryption key is used to encrypt the plaintext. The ciphertext is transmitted to a receiver, and the receiver decrypts the ciphertext, using a decryption key, back to the original plaintext. The encryption key and the decryption key are often referred to as key-pairs.

For example, public and private key-pairs can be functions of two or more large prime numbers. Each function, encryption and decryption, relies on the large prime numbers and each set is referred to as a key-pair. There are two keypairs (P, Q) for a complete system (encrypt then decrypt). To increase the security, the word-length of P and Q may be chosen to be equal, so that they can not be distinguished based on bit length, and then the product M is computed:

$$M = P*Q. \tag{1}$$

An encryption key $K_E$ is randomly chosen such that $K_E$ and $(P-1)(Q-1)$ are relatively prime. Accordingly, the decryption key $K_D$ can be computed using an extended Euclidean algorithm that satisfies:

$$K_D = K_E^{-1} \bmod((P-1)(Q-1)). \tag{2}$$

The numbers $K_D$ and M may also be relatively prime. The numbers $(K_E, M)$ may be the encryption key (or public key) used for data encryption, and the numbers $(K_D, M)$ are the decryption key used for decryption. After the keys are generated, the original message is encrypted by performing the computation of:

$$C = T^{K_E} \bmod M, \tag{3}$$

where T is the original message (plaintext) and C is the encrypted message (ciphertext). To decrypt the encrypted data, the following computation is performed:

$$T' = C^{K_D} \bmod M, \tag{4}$$

where T' is the decrypted message. T' should be the same as the original message T. As can be seen, several modular multiplications are performed.

In some encryptsystems, a long word-length, generally more than 512 bits, is usually employed to meet security requirements. However, speed performance is limited by the long word-length, requiring increasing computational speeds. For speed of computation, fast exponential computation becomes increasingly important. There are several methods, such as H-algorithm, L-algorithm, etc., which can be used to accelerate the exponential computation. One such method is the Montgomery modular multiplication algorithm, which can be used as a kernel operation in high-performance exponent-computation algorithms. The Montgomery modular multiplication algorithm also improves the efficiency of encryption and decryption operations.

The Montgomery modular multiplication algorithm is provided to compute the resulting n-bit number:

$$S_N = A*B*R^{-1} \bmod M, \text{ (where the radix } R=2^n) \tag{5}$$

required in the modular exponential algorithm, where A, B and M are the multiplicand, multiplicator, and modular number, respectively, and each has n bits. An exemplary radix 2 Montgomery iterative modular multiplication algorithm is:

$S_0 = 0$;
for (I=0; I<N; I++) {
$\quad q_I = (S_I + b_I A) \bmod 2$;
$\quad S_{I+1} = (S_I + b_I A + q_I M)/2$; }
if $(S_N \geq M)$ $S_N = S_N - M$;

where $b_I A(=PP_I)$ is a partial product; $q_I M (=MM_I)$ is a multiple of modulus M which makes one least significant bit (LSB) of $SPP_I (=_I PP_I)$ into a zero(0) value; n is the bit length of modulus M; N=n/2; $S_I$ is the partial accumulated result of a previous cycle; $S_{I+1}$ is the partial accumulated result of the current cycle with n bits; and $S_N$ is the final computation result. An exemplary radix-4 Montgomery iterative modular multiplication algorithm is:

$S_0 = 0$;
for (I=0; I<N; I++){
$\quad q_I = (((S_I + b_I A) \bmod 4)*M') \bmod 4$;
$\quad S_{I+1} = (S_I + b_I A + q_I M)/4$;}
if $(S^N \geq M)$ $S^N = S_N - M$;

where N=n/2; $(-M*M') \bmod 4 = 1$; and $-M$ is the 2's-complement of M. Both the radix-2 and the radix-4 process are iterative processes producing iterative data; data whose value changes with iterations within the loop of I=0; I<N; I++. The modular operation speed affects the system performance. Therefore, if the bit length is very long, the system performance is degraded. To compute $MM_I (=q_I M)$, first the $PP_I$ $(=b_I A)$ is computed and then the computed $PP_I$ and $S_I$ are added. Therefore, power consumption is increased because the accumulator executes the logical computation twice.

A hardware implementation of a conventional Montgomery modular multiplication algorithm is shown in FIG. 1, which utilizes two carry propagate adders 91 and 92 (hereinafter abbreviated as CPAs). The first CPA 91 is provided for a multiplication operation, and receives a previous computation result and a result of $a_i$ ANDed with B outputted from an AND logic 93 that receives the $a_j$ and B. The second CPA 92 is provided for a modular operation, and receives the output of the result of the first CPA 91 and a result of $q_i$ ANDed with N from an AND logic 94. The output of the CPA 92 is shifted to right by one bit with a shifter 95, so as to divide the output result by 2, thereby generating the computation result for one iteration.

To complete a 512-bit Montgomery modular multiplication, there are 512 iterations, which can be temporally expensive. As a result, the speed of a 512-bit RSA en/decryption is still slower than the current network transmission bandwidth speed.

The Montgomery modular multiplication may be time-consuming and affects the operation in digital appliances including cryptographic computation devices. To manufacture high performance digital appliances, it is often necessary to improve the speed of the modular operation.

In addition to speed, an additional concern is power consumption. A low power consumption is desirable, for example in smart card and mobile products, low power consumption becomes more important. Smart card and mobile products use cryptographic computation devices to secure data (contents) and improving the efficiencies of the devices can improve the power consumption characteristics of these devices. Additionally computational devices consume a lot of power, and the majority of the power is consumed by modular multiplication. In particular, as the bit length increases, the more power is required in the modular operation.

SUMMARY OF THE INVENTION

Exemplary embodiments of the present invention provide for methods of accelerating the speed of Montgomery modular multiplication and/or reducing power consumption by using register pipelines and/or manipulating the arrival time of data to the accumulator.

In exemplary embodiments of the present invention, a pipeline method can be used in a Booth recoder of the Montgomery multiplier to accelerate the speed of the Montgomery modular multiplication.

In exemplary embodiments of the present invention the arrival of a partial product of the I-th iteration ($PP_I$) and a multiple of modulus of the I-th iteration ($MM_I$) at the accumulator at nearly the same time, aids to reduce the power consumption in the Montgomery modular multiplication. Thus, the computational operation of the accumulator is decreased.

In exemplary embodiments of the present invention, the use of a feedback register reduces the number of multiplex operations. If the partial product $PP_I$ or multiple modulus $MM_I$ value of a current iteration is selected "0", where "0" means it does not have to be added, the value of previous iteration is used without a multiplex operation. Thus, multiplex operations (where the number of multiplex operations is more than "n") are unnecessary.

In exemplary embodiments of the present invention, an average Hamming distance is reduced, where the Hamming distance is the number of different values of the same bit position. Thus, fewer bit changes can result in the reduction of the variation of fan-out (multiplexer) loading.

Further areas of applicability of embodiments of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

Embodiments of present invention will become more fully understood from the detailed description and the accompanying drawings, wherein:

FIG. 3 is a table describing selection criteria for the multiple of modulus $MM_I$ in an exemplary embodiment of the present invention;

FIG. 4 is a table describing selection criteria for the partial product $PP_I$ in an exemplary embodiment of the present invention.

DETAILED DESCRIPTION OF EXEMPLARY EMBODIMENTS OF THE PRESENT INVENTION

The following description of exemplary embodiment(s) is merely illustrative in nature and is in no way intended to limit the invention, its application, or uses.

Figure 1:
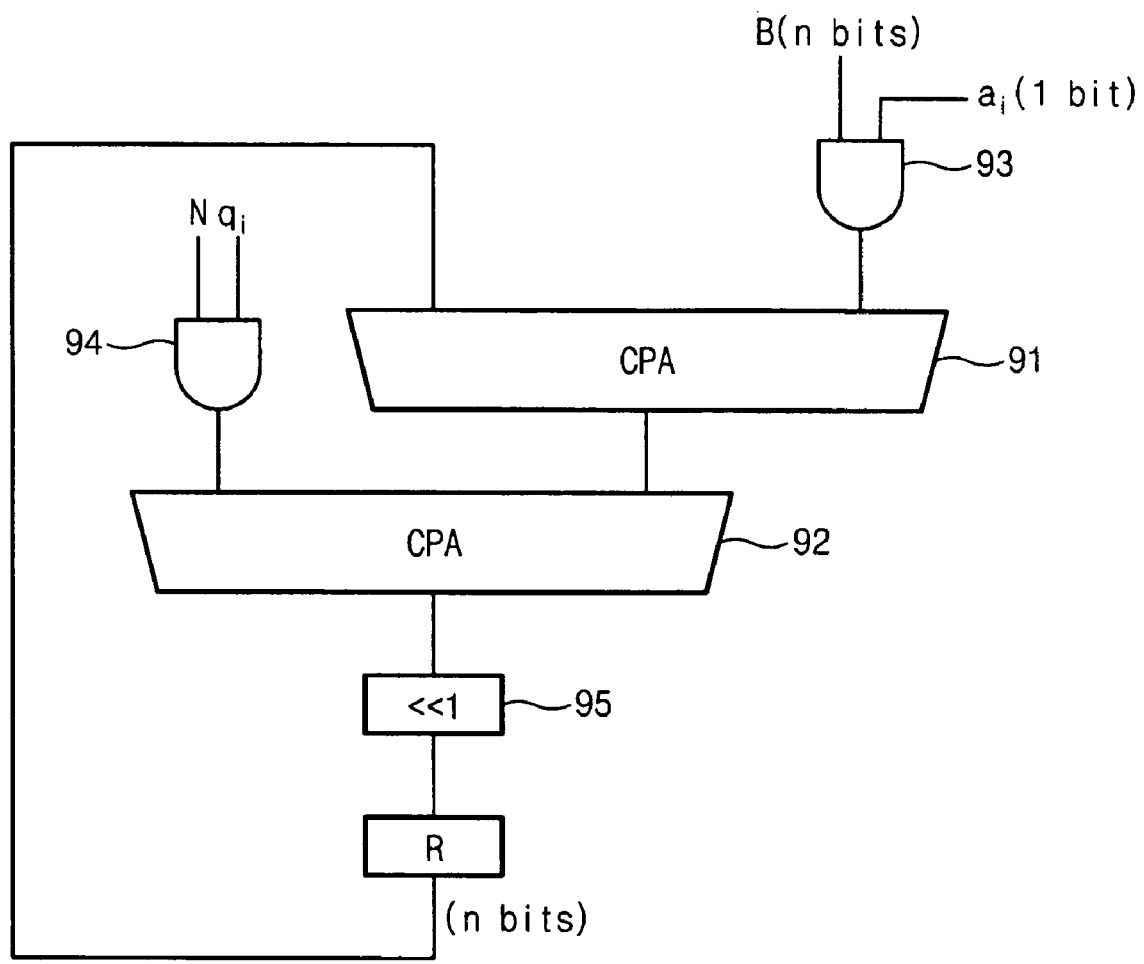
FIG. 1 is an illustration of a background art hardware implementation of a Montgomery modular multiplication algorithm.
Figure 2:
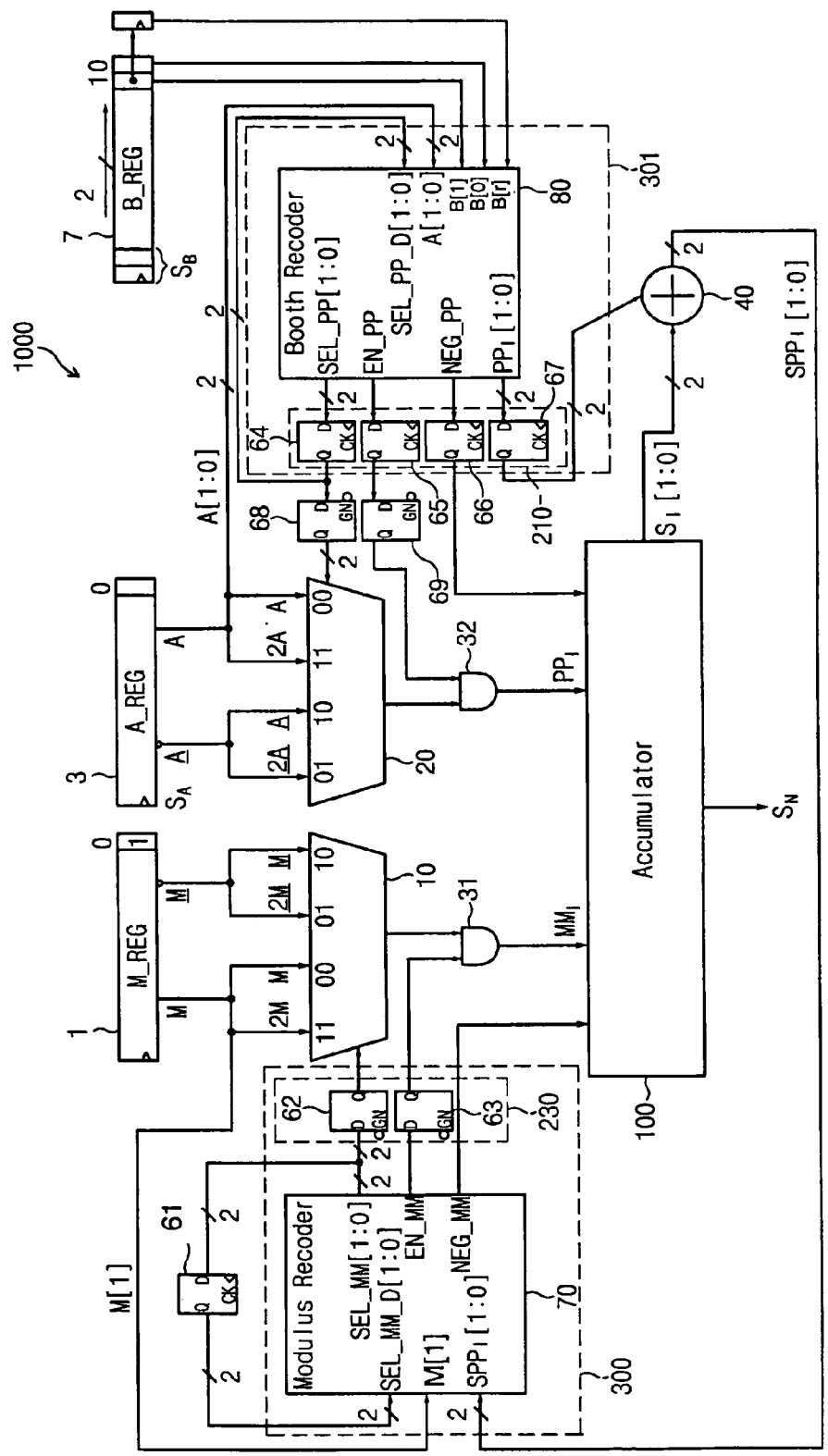
FIG. 2 is an illustration of a modular multiplier of an exemplary embodiment of the present invention.

FIG. 2 illustrates a modular multiplier 1000 of an exemplary embodiment of the present invention. The multiplier 1000 can include a modulus (M) stored in a register 1, a multiplicand (A) stored in a register 3, a multiplicator (B) stored in a register 7, a Booth processor 301, a Modulus processor 300, a multiplexer (MUX) 10 aiding in the computation of the multiple modulus $MM_I$, a MUX 20 aiding in the computation of the partial product $PP_I$, and an accumulator 100 for aiding in the computation of the modular multiplication. The accumulator 100 inputs a partial product value $PP_I$ and the multiple modulus value $MM_I$ and produces a result for the Montgomery multiplier. In exemplary embodiments of the present invention, the positive value M can have n bits (M[n−1:0]). The positive or negative value A can have n+1 bits (A[n:0]), one bit for a sign bit. Finally, B can be positive or negative. Thus, if n is even B has n+2 bits, two bits being sign bits or if n is odd B has n+1 bits, one bit being a sign bit.

In exemplary embodiments of the present invention, register 1 provides the modulus M and $\underline{M}$, where $\underline{M}$ is the one's complement of M. Similarly register 3 provides the multiplicand A and $\underline{A}$, where $\underline{A}$ is the one's complement of A.

The multiplier 1000 solves the modular multiplication, as shown according to Equation (5), in an iterative process. The Modulus processor 300 and a multiplexer 10 are used to select multiple modulus ($MM_I$) values. To select $MM_I$ values, the Modulus processor 300 receives iterative data from the accumulator 100. The iterative data, $SPP_I[1:0]$, is the combination of the two LSBs of the value in a sum registry of the accumulator ($S_I[1:0]$), and the two LSBs of the partial product value ($PP_I[1:0]$). $S_I[1:0]$ and $PP_I[1:0]$ are combined in a 2-bit adder 40 to form $SPP_I[1:0]$. In addition to $SPP_I[1:0]$ the Modulus processor 300 inputs the second significant bit of the Modulus, M[1]. The Modulus processor 300 uses $SPP_I[1:0]$ and M[1] to generate output signals, which determine the selection of a multiple modulus $MM_I$ value. In further exemplary embodiments of the present invention, the $SPP_I$ value can be the combination of more than two values and/or multiple number of bits, the example given herein should not be interpreted as limitative of the scope of the present invention.

The Modulus processor 300 can output multiple signals (e.g., a multiple modulus selection signal SEL_MM[1:0], a multiple modulus enabling signal EN_MM, a multiple modulus negation signal NEG_MM, . . . ). These signals may be stored in register 230. For example, multiple modulus selection signal SEL_MM[1:01] may be stored in sub-register 62, while multiple modulus enabling signal EN_MM may be stored in sub-register 63. In an exemplary embodiment of the present invention, the Modulus processor 300 and multiplexer 10 are used to select multiple modulus values ($MM_I$) values (e.g., 2M, M, 0. −M, . . . ) to supply to the accumulator 100. To select $MM_I$ values, the Modulus processor 300 outputs multiple modulus selection signal SEL_MM[1:0] to the multiplexer 10. The multiplexer 10 receives the value of the Modulus M and SEL_MM[1:0] and outputs a value to AND gate 31. The AND gate 31 receives the input from the multiplexer 10 and a multiple modulus enabling signal EN_MM from the Modulus processor 300. The AND gate 31 then outputs the value of $MM_I$. The multiple modulus negation signal NEG_MM and $MM_I$ are combined at the accumulator 100, where NEG_MM is used to indicate bit-inversion, obtaining a $MM_I$ value of $-M$.

Each MUX operation consumes power and energy, hence when a new SEL_MM[1:0] value is used, a MUX operation is performed to change the settings and select a $MM_I$ value. Using the previous value of SEL_MM[1:0] results in no change in settings and thus no MUX operation. Reducing the necessary number of MUX operations in $MM_I$'s selection decreases the overall power consumption of the multiplier 1000.

In exemplary embodiments of the present invention, the Modulus processor 300 further includes a multiple modulus feedback register 61 and a Modulus recoder 70. The feedback register 61 stores the value of SEL_MM[1:0] of the previous iteration as the value SEL_MM_D[1:0]. When the value of $MM_I=0$ is desired, the modulus processor 300 outputs a multiple modulus enabling signal, EN_MM, with a value of 0. The signal EN_MM is input to an AND gate 31. The AND gate 31 inputs the output of the multiplexer 10, which uses the previous value of the multiple modulus selection signal SEL_MM_D[1:0], hence using no MUX operations, and the AND gate 31 outputs a value of $MM_I=0$. The assignment of $MM_I=0$ without a MUX operation decreases the power consumption of the multiplier 1000. A coding scheme similar to that described above is shown in FIG. 3.

FIG. 3 illustrates a coding scheme in accordance with exemplary embodiments of the present invention. Although FIG. 3 shows three inputs to the Modulus recoder 70, the present invention can have a variety of inputs and outputs depending upon the design criteria, for example FIG. 2 shows an additional input SEL_MM_D[1:0]. The coding scheme in FIG. 3 illustrates that for values of EN_MM=0 the selected $MM_I$ value is 0, and the value of SEL_MM[1:0]= SEL_MM_D[1:0].

In another exemplary embodiment of the present invention, a similar method of power reduction can be used with the Booth processor 301. As mentioned above, the multiplier 1000 solves for modular multiplication in an iterative process, which includes the supply of $MM_I$ and partial product values ($PP_I$) to the accumulator 100. The Booth processor 301 and multiplexer 20 are used to select partial product ($PP_I$) values (e.g. 0, A, 2A, -2A, -A, ...) to supply to the accumulator 100. The Booth processor 301 inputs the two LSBs of the multiplicand (A[1:0]), the two LSBs of the multiplicator (B[1] and B[0]) and B[r], a previous iteration's value of B[1].

To select $PP_I$ values, the Booth processor 301 outputs a partial product selection signal SEL_PP[1:0] to the multiplexer 20. The multiplexer 20 receives the value of the multiplicand A and partial product selection signal SEL_PP[1:0] and outputs a value to an AND gate 32. The AND gate 32 receives the input from the multiplexer 20 and a partial product enabling signal EN_PP from the Booth processor 301. The AND gate 32 then outputs the selected value of the partial product ($PP_I$), which is supplied to the accumulator 100. Analogous to the procedure as discussed above, the Booth processor 301 may include a Booth recoder 80 and a partial product feedback register 64. A zero value of $PP_I$ can be selected by storing SEL_PP_D[1:0], a previous value of SEL_PP[1:0], in the partial product feedback register 64. When the value of $PP_I=0$ is desired, the Booth processor 301 outputs a partial product enabling signal EN_PP with a value of 0. The signal EN_PP is input to an AND gate 32. The AND gate 32 inputs the output of the multiplexer 20, which uses the previous value of the multiple modulus selection signal SEL_PP_DE[1:0], hence using no MUX operations, and the AND gate 32 outputs a value of $PP_I=0$. The assignment of $PP_I=0$ without a MUX operation decreases the power consumption of the multiplier 1000. A coding scheme similar to that described above is shown in FIG. 4.

FIG. 4 illustrates a coding scheme in accordance with exemplary embodiments of the present invention. Although FIG. 4 shows three inputs to the Booth feeedef Recoder 70, the present invention can have a variety of inputs and outputs depending upon the design criteria. For example, FIG. 2 shows additional inputs SEL_PP_D[1:0] and A[1:0]. The coding scheme in FIG. 4 illustrates that for values of EN_PP=0, the selected $PP_I$ value is 0, and the value of SEL_PP[1:0]=SEL_PP D[1:0]. Output values of $PP_I$[0] shown include 0 and A[0], while output values of $PP_I$[1] shown include 0, A[0], and A[1]A[0] (A[1] exclusive-OR A[0]).

Additionally, in exemplary embodiments of the present invention, a coding scheme, an example of which is illustrated in FIG. 4, reduces an average Hamming distance. The Hamming distance is the number of different values of the same bit position. For examples, if SEL_PP[1:0] has the value "00", corresponding to a $PP_I$ value of "A", in the (I−1)-th iteration then a value of SEL_PP[1:0] in the I-th iteration of "11" corresponding to a $PP_I$ value of "2A", results in a Hamming distance of two (2). It is desirable to reduce the Hamming distance between two values and thus the number of bit inversions and computation power usage. By selecting a coding scheme where if a previous iteration $PP_I$ value is A or 2A, then the subsequent iteration $PP_I$ value is restricted and can not be 2A and if a previous iteration $PP_I$ value is −A or −2A, then the subsequent iteration $PP_I$ value is restricted and can not be −2A. FIG. 4 illustrates various bit values for the coding scheme, however the coding scheme of exemplary embodiments of the present invention should not be interpreted to be limited to the bit pattern shown in FIG. 4. For example, a value of $PP_I$ for "A" can correspond to a SEL_PP[1:0] value of 10 instead of the shown 00.

A similar Hamming distance coding scheme, as used for the selection of $PP_I$ values discussed above, can be applied for the selection of values of $MM_I$.

Although FIG. 2 illustrates the use of 4:1 multiplexers, exemplary embodiments of the present invention are not limited to a particular ratio value of the multiplexer.

In conventional iterations, the Modulus processor 300 and the Booth processor 301 are run sequentially. However, the Booth processor 301 is isolated from the iterative nature of the solution of the multiplier 1000. In an exemplary embodiment of the present invention the Booth processor 301 supplies the two LSBs of the partial product ($PP_I$[1:0]), which is added to an accumulated result of previous iterations ($S_I$[1:0]), supplied by the accumulator 100, producing $SPP_I$[1:0]. In other exemplary embodiments, various bits and number of bits can be used to produce $SPP_I$. The value $SPP_I$[1:0] is used by the Modulus processor, while register 7 (storing the value of B) is shifted to the right by two bits. After register 7 has been shifted, independent of the activity of the Modulus processor 300, the new values of B[1], B[0], and B[r] are input to the Booth processor 301. Thus, the Booth processor 301 can be operated while the Modulus processor 300 is operated. A pipeline register 210 stores the Booth processor(301)'s output SEL_PP[1:0], EN_PP, NEG_PP, and $PP_I$[1:0] in sub-registers 64-67, respectively. Pipeline registers improve the hardware performance of the multiplier by reducing the length of critical path. The above steps may be repeated until B[1] is the highest bit of multiplicator B. The simultaneous operation of the Booth processor 301 and the Modulus processor 300 increases the overall computational speed of the multiplier 1000.

As discussed above, the multiplier 1000 inputs the multiple modulus $MM_I$ and the partial product $PP_I$. Typically first $PP_I$ and then $MM_I$ are input to the accumulator 100. To compute $MM_I$, first the $PP_I$ is computed, a first logical operation, and then the $PP_I$ and $S_I$ are combined, a second logical operation, and then SEL_MM[1:0] and EN_MM are computed by the modulus processor, a third logical operation as discussed above. The two values $PP_I$ and $MM_I$ are not input at the same time because each travels a different circuit path. Therefore, power consumption is increased because the accumulator executes the logical operation twice. The power consumption can be reduced if the two values $PP_I$ and $MM_I$ arrive at the same or substantially the same time to the accumulator 100.

In exemplary embodiments of the present invention, synchronization registers may be provided to synchronize the arrival time of $PP_I$ and $MM_I$ to the accumulator. The Booth processor 301 contributes SEL_PP[1:0] and EN_PP to multiplexer 20 and AND gate 32 respectively to select the partial product $PP_I$, as discussed above. Likewise the Modulus processor 300 contributes SEL_MM[1:0] and EN_MM to multiplexer 10 and AND gate 31 respectively to select a multiple modulus value $MM_I$. Saving values SEL_PP[1:0], EN_PP and/or SEL_MM[1:0], EN_MM, in synchronization register(s) allows the synchronization of $MM_I$ and $PP_I$.

In an exemplary embodiment of the present invention, a multiple modulus synchronization register 240 and/or a partial product synchronization register 220 are provided. Syncronization registers 220 and 240 use reverse clock phase with respect to clock phase of other registers in multiplier 1000. The multiple modulus synchronization register 240 may store values of SEL_MM[1:0] and EN_MM in sub-registers 62 and 63 respectively. If a partial product synchronization register 220 is used, it may store values of SEL_PP[1:0] and EN_PP in sub-registers 68 and 69 respectively. One or both synchronization registers can be used and the discussion herein should not be interpreted to limit the exemplary embodiments of the present invention to one synchronization register. In exemplary embodiments where both synchronization registers are used, SEL_PP[1:0] and SEL_MM[1:0] are stored in sub-registers 68 and 62, respectively, while EN_PP and EN_MM are stored in sub-registers 69 and 63, respectively. In response to a clock signal CK SEL_PP[1:0] is input to multiplexer 20 substantially at the same time as SEL_MM[1:0] is input to multiplexer 10. Similarly, in response to the clock signal CK, EN_PP is input to AND nate 32 substantially at the same time as EN_MM is input to AND gate 31. The outputs of the multiplexers 20 and 10 are generated substantially at the same time. Similarly, the outputs of AND gates 32 and 31 are generated substantially at the same time. Thus, $MM_I$ and $PP_I$ are synchronized and supplied to the accumulator 100. Thus one logical operation can be performed per data set $MM_i$ and $PP_I$, as opposed to the conventional two logical operations, significantly decreasing the power consumption of multiplier 1000.

Variations and combinations of the exemplary embodiments of the present invention thus discussed are intended to be within the scope of the present invention.

Figure 5:
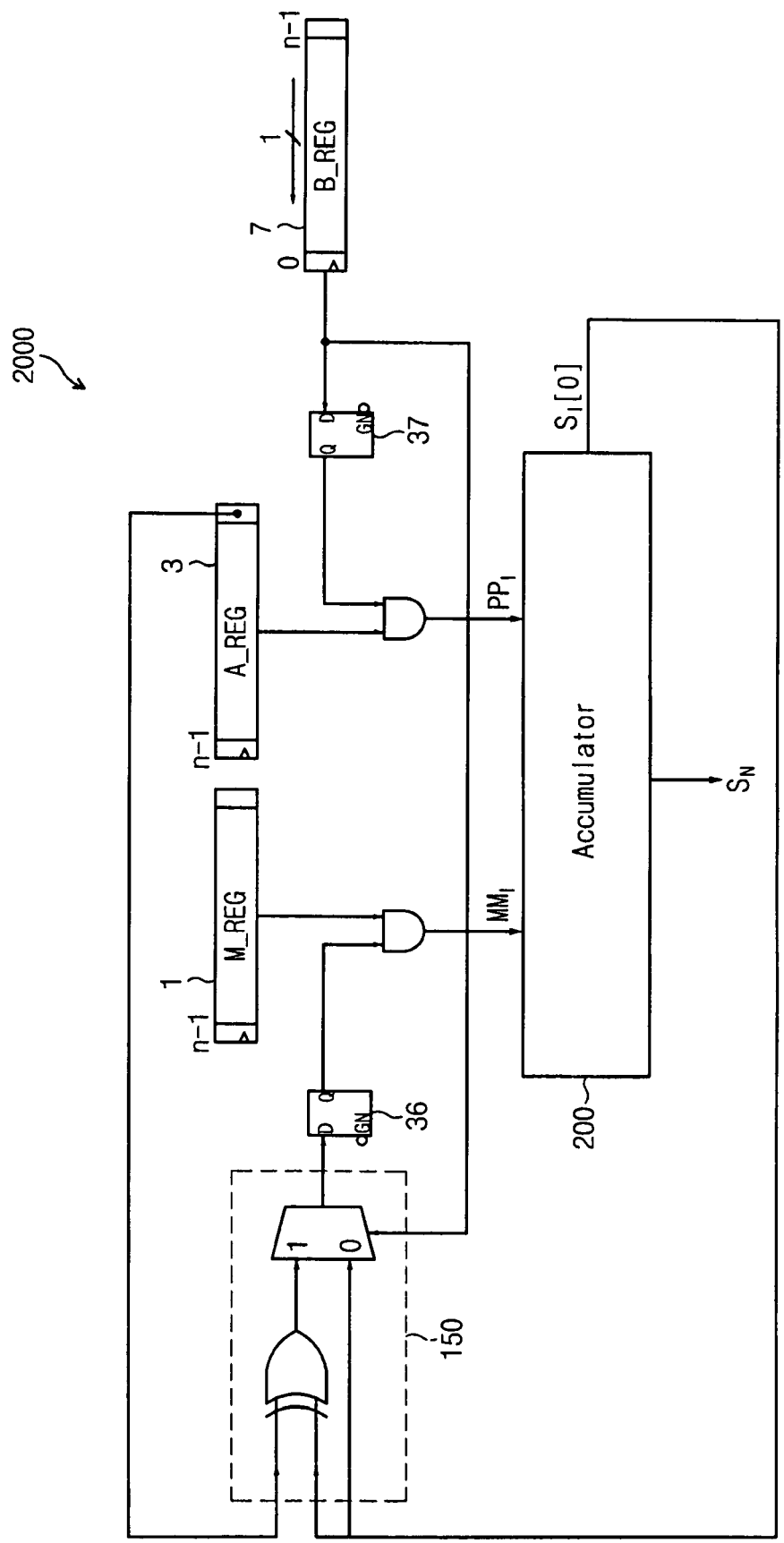
FIG. 5 is an illustration of a Radix-2 modular multiplier in an exemplary embodiment of the present invention.

Exemplary embodiments of the present invention are not limited by the Radix of the Montgomery multiplication; they can be used in a variety of Radix based multipliers. For example, FIG. 5 illustrates a Radix-2 system having a multiple modulus synchronization (synch) register 36 and/or another synch register 37, for storage of the multiplier value (B). As discussed above, synch registers 36 and 37 can be used to provide the accumulator 200 with substantially simultaneous values of $PP_I$ and $MM_I$ reducing the power consumption and increasing the speed of the multiplier 2000. Additional exemplary embodiments of the present invention can use one or both synchronization registers.

The description of the invention is merely exemplary in nature and, thus, variations that do not depart from the gist of the invention are intended to be within the scope of the embodiments of the present invention. Such variations are not to be regarded as a departure from the spirit and scope of the present invention. For example multiplexers 10 and 20 can have a variety of ratio values. The multiple modulus synchronization sub-register 62 can function a dual purpose as a multiple modulus feedback register without having an additional separate multiple modulus feedback register 61. Likewise, partial product feedback register 64 can serve a dual purpose as a sub-register of the partial product synchronization register 220, thus removing the need for both a sub-register 68 and a feedback register 64. In other variations the synchronization registers 220 and 240 can be used without other registers such as a pipeline register and/or feedback registers.

What is claimed is:

1. A multiplier, comprising:
a Booth recoder;
a partial product synch register;
a modulus recoder;
a multiple modulus synch register; and
a Booth AND gate;
wherein an input to the partial product synch register is at least one output from the Booth recoder,
wherein an input to the multiple modulus synch register is at least one output from the modulus recoder,
wherein the partial product synch register and the multiple modulus synch register are used to synchronize signals derived from the at least one output of the Booth recoder and the at least one output of the modulus recoder, and
wherein at least one value from the partial product synch register is input to the Booth AND gate.

2. The multiplier of claim 1, further comprising:
a modulus AND gate;
wherein at least one value from the multiple modulus synch register is input to the modulus AND gate.

3. A multiplier, comprising:
a modulus recoder;
a modulus feedback register;
a Booth recoder;
a Booth register; and
a Booth AND gate;
wherein an input to the modulus feedback register is at least one output from the modulus recoder,
wherein an input to the Booth register is at least one output from the Booth recoder,
wherein the modulus feedback register and the Booth register save values enabling decreased computation power usage in the multiplier, and
wherein at least one value from the Booth register is input to the Booth AND gate.

4. The multiplier of claim 3, wherein the Booth register is a feedback register that stores at least one output value of the Booth recoder to be fed back to the Booth recoder.

5. The multiplier of claim 4, wherein the at least one output value is a partial product selection signal, and
wherein the partial product selection signal is used to select a partial product value.

6. The multiplier of claim 3, wherein the Booth register is a pipeline register, and wherein the pipeline register stores output values of the Booth recoder.

7. The multiplier of claim 3, wherein the modulus feedback register stores at least one output value of the modulus recoder to be fed back to the modulus recoder.

8. The multiplier of claim 7, wherein the at least one output value is a multiple modulus selection signal, and
wherein the multiple modulus selection signal is used to select a multiple modulus value.

9. The multiplier of claim 3, further comprising:
a modulus AND gate;
wherein at least one value from the modulus feedback register is input to the modulus AND gate.

10. A partial product generator, comprising:
a Booth recoder;
a mux; and
a Booth AND gate;
wherein the mux inputs at least one output from the Booth recoder,
wherein the Booth recoder and the mux are used to obtain a partial product, and
wherein at least one value from the mux is input to the Booth AND gate.

11. The partial product generator of claim 10, wherein the Booth recoder generates a partial product selection signal and a bit pattern is assigned to any value of the partial product selection signal that is prohibited based on a previous value of the partial product selection signal.

12. The partial product generator of claim 11, wherein the bit pattern is chosen so that a Hamming distance between a current value of the partial product selection signal and the previous value of the partial product selection signal is reduced.

13. The partial product generator of claim 11, wherein the bit pattern is chosen so that an average temporal Hamming distance between the current values of the partial product selection signal and corresponding previous values of the partial product selection signal are reduced.

14. The partial product generator of claim 11, wherein the Booth recoder comprises:
a first mux; and
a second mux;
wherein the first mux inputs a first portion of the previous value of the partial product selection signal and outputs a first portion of a current partial product selection signal, and
wherein the second mux inputs a second portion of the previous value of the partial product selection signal and outputs a second portion of the current partial product selection signal.

15. The partial product generator of claim 14, wherein the first mux and the second mux are 8:1 muxs.

16. A multiple modulus generator, comprising:
a modulus recoder; and
a first mux;
wherein if an enabling signal does not have a predetermined value, the modulus recoder generates a current multiple modulus selection signal,
wherein if the enabling signal does have the predetermined value, a previous value of a multiple modulus selection signal is used without generating the current multiple modulus selection signal, and
wherein the current multiple modulus selection signal or the previous value of the multiple modulus selection signal is used to select a multiple modulus value, wherein the modulus recoder comprises:
a second mux; and
a third mux;
wherein the second mux inputs a first portion of the previous value of the multiple modulus selection signal and outputs a first portion of the current multiple modulus selection signal, and
wherein the third mux inputs a second portion of the previous value of the multiple modulus selection signal and outputs a second portion of the current multiple modulus selection signal.

17. The multiple modulus generator of claim 16, further comprising:
a modulus AND gate;
wherein at least one value from the first mux is input to the modulus AND gate.

18. The multiple modulus generator of claim 16, wherein the second mux and the third mux are 8:1 muxs.

19. A multiplier, comprising:
a modulus recoder;
a modulus feedback register;
a modulus synch register;
a Booth recoder;
a Booth synch register;
a Booth register; and
a Booth AND gate;
wherein an input to the modulus feedback register is at least one first output from the modulus recoder,
wherein an input to the modulus synch register is at least one second output from the modulus recoder,
wherein an input to the Booth synch register is at least one first output from the Booth recoder,
wherein an input to the Booth register is at least one second output from the Booth recoder,
wherein the modulus feedback register and the Booth register save values enabling decreased computation power usage in the multiplier,
wherein the Booth synch register and the modulus synch register are used to synchronize signals derived from the outputs of the Booth recoder and the modulus recoder to decrease glitches, and
wherein at least one value from the Booth sync register is input to the Booth AND gate.

20. The multiplier of claim 19, wherein the Booth register is a feedback register that stores the at least one second output of the Booth recoder to be fed back to the Booth recoder.

21. The multiplier of claim 20, wherein the at least one second output is a partial product selection signal, and
wherein the partial product selection signal is used to select a partial product value.

22. The multiplier of claim 19, wherein the Booth register is a pipeline register, and
wherein the pipeline register stores output values of the Booth recoder.

23. The multiplier of claim 19, wherein the modulus feedback register stores the at least one first output of the modulus recoder to be fed back to the modulus recoder.

24. The multiplier of claim 23, wherein the at least one first output is a multiple modulus selection signal, and
wherein the multiple modulus selection signal is used to select a multiple modulus value.

25. The multiplier of claim 19, further comprising:
a modulus AND gate;
wherein at least one value from the modulus sync register is input to the modulus AND gate.

26. The multiplier of claim 19, wherein a multiple modulus value and a partial product value are synchronized by using values from the modulus synch register and values from the Booth synch register.

27. A Montgomery multiplier, comprising;

means for inputting, wherein the means for inputting enters values for a modulus, multiplicand, and a multiplier;

means for Booth storing, wherein the means for Booth storing stores at least one output value from a Booth recoder;

means for modulus storing, wherein the means for modulus storing stores at least one output value from a modulus recoder;

means for partial product generation, wherein the means for partial product generation produces a partial product value using input from the means for input;

means for multiple modulus generation, wherein the means for multiple modulus generation produces a multiple modulus value using the input from the means for input;

means for synchronizing, wherein the means for synchronizing synchronizes the partial product value and multiple modulus value; and means for accumulating, wherein the means for accumulating inputs the synchronized partial product value and multiple modulus value and produces a result for the Montgomery multiplier;

wherein the means for synchronizing includes a Booth AND gate and a modulus AND gate.

* * * * *